US008081659B2

(12) United States Patent
Sowinski et al.

(10) Patent No.: US 8,081,659 B2
(45) Date of Patent: Dec. 20, 2011

(54) MAP MESSAGE EXPEDIENCY MONITORING AND AUTOMATIC DELAY ADJUSTMENTS IN M-CMTS

(75) Inventors: Pawel Sowinski, Northborough, MA (US); Michael J. Healy, Berlin, MA (US); John T. Chapman, Laguna Niguel, CA (US); Daniel W. Crocker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 12/167,168

(22) Filed: Jul. 2, 2008

(65) Prior Publication Data

US 2010/0002719 A1 Jan. 7, 2010

(51) Int. Cl.
*H04J 3/16* (2006.01)
(52) U.S. Cl. .......................... 370/468; 370/389; 725/111
(58) Field of Classification Search .................. 370/389, 370/395.21, 395.4, 395.41, 400, 401, 458, 370/461, 462, 465, 468, 469, 477; 725/109, 725/111
See application file for complete search history.

(56) References Cited

U.S. PATENT DOCUMENTS

| | | | |
|---|---|---|---|
| 7,065,779 B1* | 6/2006 | Crocker et al. ............... | 725/111 |
| 7,209,442 B1 | 4/2007 | Chapman | |
| 7,242,694 B2* | 7/2007 | Beser ............................ | 370/449 |
| 7,450,579 B2* | 11/2008 | Howard et al. ............... | 370/389 |
| 2002/0105965 A1* | 8/2002 | Dravida et al. ............... | 370/463 |
| 2003/0177502 A1* | 9/2003 | Kolze et al. ................... | 725/111 |
| 2004/0244044 A1* | 12/2004 | Brommer ...................... | 725/111 |
| 2006/0126660 A1* | 6/2006 | Denney et al. ................ | 370/468 |
| 2006/0251097 A1* | 11/2006 | Chapman et al. ............ | 370/431 |
| 2006/0262722 A1* | 11/2006 | Chapman et al. ............ | 370/229 |
| 2007/0086484 A1* | 4/2007 | Quigley et al. ............... | 370/468 |
| 2007/0195817 A1* | 8/2007 | Denney et al. ................ | 370/468 |
| 2007/0195824 A9 | 8/2007 | Chapman et al. | |
| 2007/0280291 A1* | 12/2007 | Beser ............................ | 370/468 |
| 2008/0123691 A1* | 5/2008 | Beser ............................ | 370/468 |
| 2009/0232111 A1* | 9/2009 | Li et al. ........................ | 370/337 |
| 2010/0128740 A1* | 5/2010 | Beser ............................ | 370/468 |
| 2010/0142553 A1* | 6/2010 | Kolze ............................ | 370/468 |

OTHER PUBLICATIONS

Cable-Television Laboratories, Inc.; DOCSIS Modular CMTS, Downstream External PHY Interface specification CM-SP-DEPI-I05-070223; Copyright 2005-2007; 80 Pages.

* cited by examiner

*Primary Examiner* — Kevin Mew
(74) *Attorney, Agent, or Firm* — Stolowitz Ford Cowger LLP

(57) ABSTRACT

An M-CMTS compatible UEQAM device implements circuitry to identify and analyze MAP message in the data stream sent from the M-CMTS Core with respect to timing information embedded in those messages. The improved UEQAM will then create a specific message as an extension to DEPI to communicate that information to the M-CMTS Core. The M-CMTS Core will employ that analysis to automatically adjust MAP message advance time to reduce delay and thus improve system performance. This invention will provide a closed-loop between the M-CMTS Core and the UEQAM where valuable transmission information will periodically be fed back from UEQAM-to-M-CMTS Core in real-time.

25 Claims, 3 Drawing Sheets

MAP MESSAGE EXPEDIENCY MONITORING AND AUTOMATIC DELAY ADJUSTMENTS IN M-CMTS

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. Cable Television Laboratories, Inc. (CableLabs®) publishes detailed technical specifications for such systems, including DOCSIS—Data Over Cable Service Interface Specification. In typical cable systems, a Modular Cable Modem Termination System Core (M-CMTS Core) connects the cable network to a data network, such as the Internet. A downstream Universal Edge QAM (UEQAM) located in the cable network receives data transferred from the M-CMTS Core over a packet switched portion of the network (which can be characterized as having variable transmission delays), performs modulation and other processing, and then transfers the ITU-T J.83 modulated data over a Hybrid Fiber Coaxial (HFC) portion of the cable network, which is specified as having a constant transmission delay.

DOCSIS specifies that the cable modems obtain upstream bandwidth according to a request/grant scheme. A cable modem sends a bandwidth allocation request when it receives a packet from a subscriber device and the packet needs to be sent upstream into the cable network. The M-CMTS Core grants these requests using bandwidth allocation map ("MAP") messages. The MAP contains information that indicates when a cable modem can transmit and for how long. The modem then waits for its scheduled time before it can transmit. This cycle is referred to as the request-grant cycle. The maximum number of transmit bursts per second that an individual cable modem can send is inversely proportional to the request-grant cycle duration. To minimize that cycle time, the CMTS must ensure that the MAP messages reach the Cable Modems in a timely manner, despite numerous competing factors that can impact the generation and delivery of MAP messages, especially in the M-CMTS systems where the M-CMTS Core and UEQAM are separated by a variable-delay network. The present disclosure in one aspect enables dynamic delay adjustment for MAP messages in an M-CMTS environment.

Recently, some systems have employed a Universal Edge QAM or ("UEQAM"). A UEQAM processes both video and DOCSIS data. In the following description and the appended claims, we use the term EQAM broadly to include both UEQAM and EQAM.

DESCRIPTION OF EXAMPLE EMBODIMENTS

Overview

Figure 1:
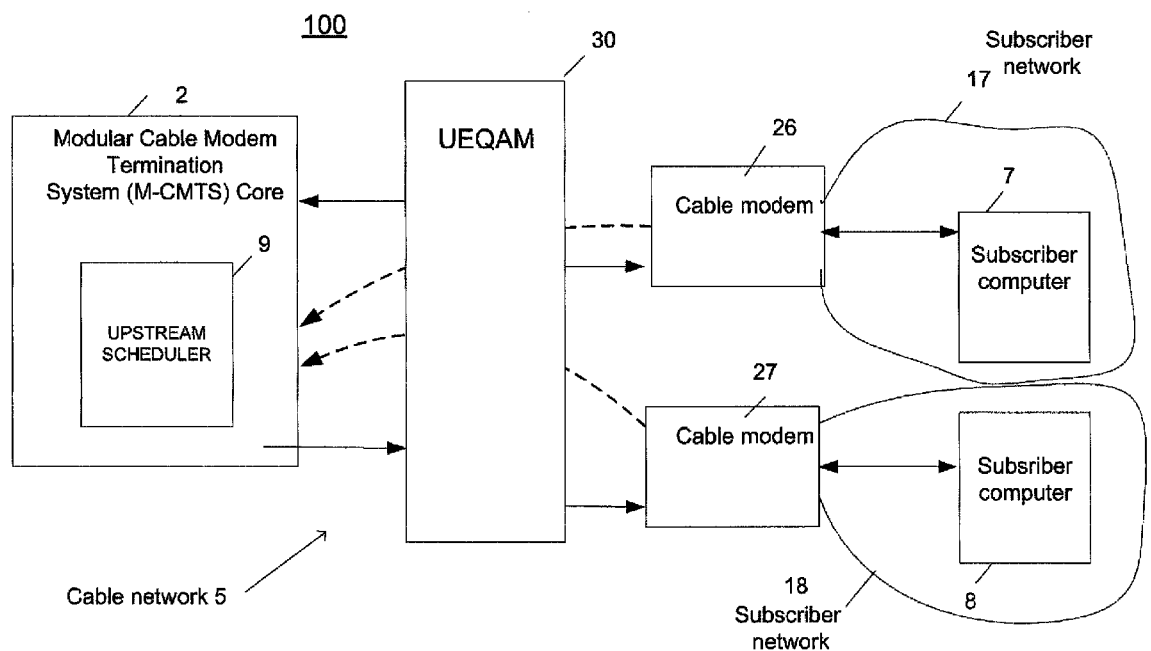
FIG. 1 is a simplified block diagram illustrating a portion of a cable network.

In one embodiment, methods and apparatus are disclosed for dynamically adjusting delay for MAP messages in a Modular CMTS (M-CMTS) cable network system to simplify system configuration and improve performance. More specifically, an M-CMTS compatible UEQAM device is arranged to identify, copy locally and analyze a MAP messages in the data stream sent from the M-CMTS Core with respect to timing information embedded in those messages. The improved UEQAM will then create a specific message, preferably as an extension to the CableLabs DEPI L2TPv3 Control Plane interface, to communicate that information back to the M-CMTS Core where the MAP message originated. The M-CMTS Core will employ that timing feedback information to automatically adjust MAP message advance time to optimize delay and thus improve system performance. This closed-loop feedback technology can function in "real-time" and dynamically adjust MAP Advance thus greatly improving round-trip request-grant latencies and jitter.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

By way of background, FIG. 1 is a simplified block diagram of a system 100. The example system 100 includes a Modular Cable Modem Termination System Core (M-CMTS Core) 2 having software 9 for scheduling upstream bandwidth. The example system also includes A Universal Edge QAM (UEQAM) 30 which includes downstream PHYs (not shown), and a plurality of cable modems 26, 27 providing the subscriber computers 7, 8 and subscriber networks 17, 18 respectively, access to the cable network 5.

Figure 2:
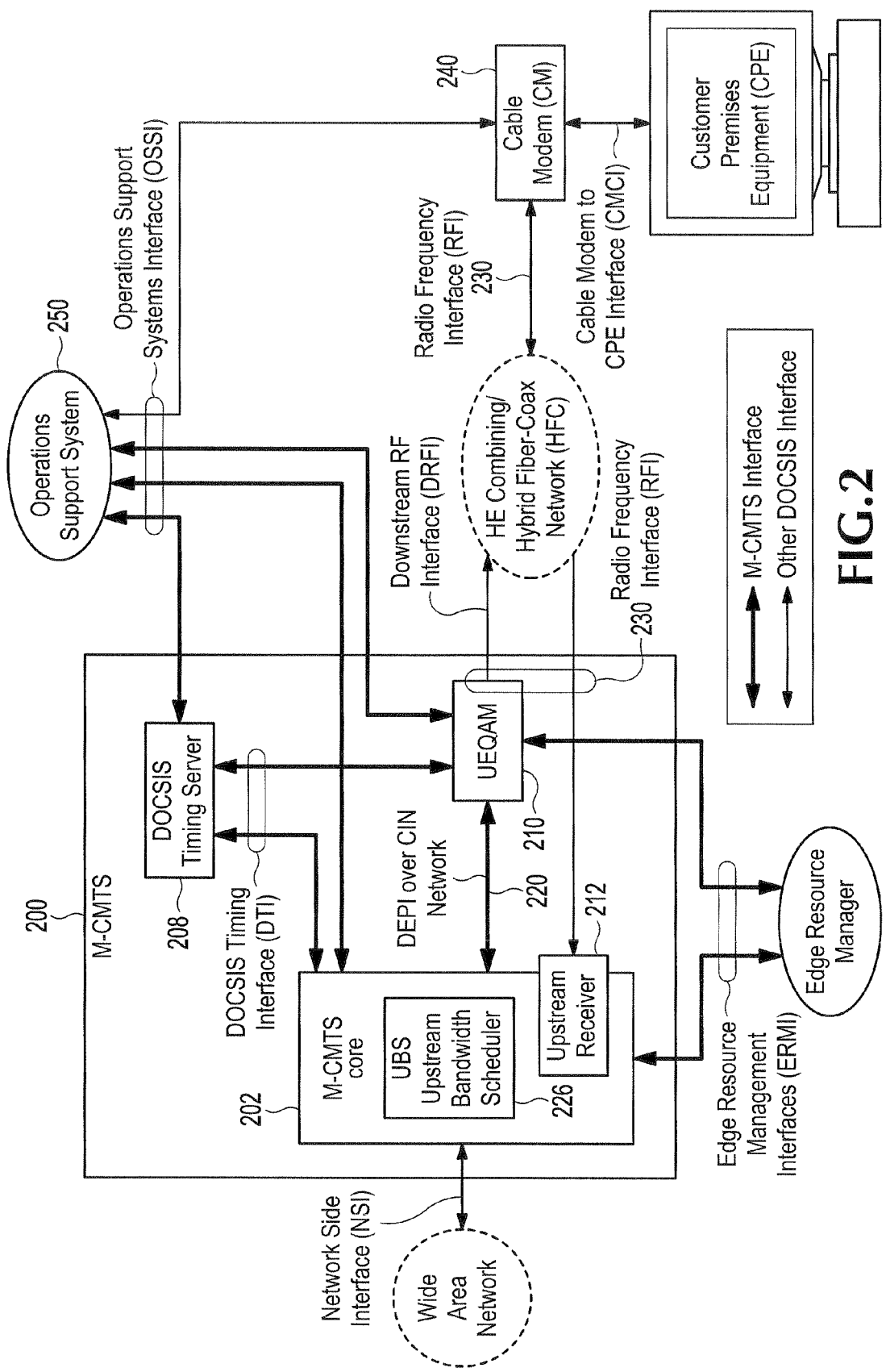
FIG. 2 is a simplified block diagram illustrating a Modular M-CMTS architecture.

FIG. 2 illustrates a Modular CMTS ("M-CMTS") architecture. The equipment and interfaces shown in the drawing are generally known and are described in detail in the DOCSIS (Data Over Cable Service Interface Specification) specifications. Briefly, to identify the environment of the present disclosure, the M-CMTS 200 comprises in one embodiment an M-CMTS Core 202, a DOCSIS Timing Server 208 and at least one UEQAM 210. The M-CMTS Core 202 contains the DOCSIS MAC (media access control). The MAC layer is the means of coordinating upstream traffic from the cable modem to the M-CMTS Core. This generally includes signaling functions, upstream bandwidth scheduling, packet forwarding functions, downstream packet scheduler and DOCSIS framing. Put another way, the M-CMTS Core in general contains everything a traditional CMTS (I-CMTS) does, except for the functions performed in the UEQAM 210. The segregation of these functions is important to the timing challenges further explained below. In particular, the M-CMTS architecture introduces non-zero delays in between sub-functions. More specifically, interposing a Converged Interconnect Environment (CIN) between the M-CMTS Core and the UEQAM increases and makes variable the delay between M-CMTS core and the EQAM.

The Universal Edge QAM device 210, or "UEQAM" for short, typically comprises a chassis having one or more gigabit Ethernet (GigE) input ports, and multiple QAM modulators and RF upconverters on the output (downstream) side. The EQAM's downstream RF interface is connected to a Cable Modem (CM) 240, generally located at a customer premises. The Radio Frequency Interface (RFI) 230 represents an abstract interface between the CMTS and the CM. Referring again to the M-CMTS 200, a DOCSIS Timing Server 208 provides a common frequency of 10.24 MHz and a DOCSIS timestamp to other M-CMTS elements, including the UEQAM 210, via the DOCSIS Timing Interface (DTI). (This timestamp value is referred to below as the "current M-CMTS time" or the "DOCSIS time".) The Downstream External-Phy Interface or "DEPI" 220 interconnects the M-CMTS Core 202 to the UEQAM 210. In one embodiment, it comprises an IP Tunnel between the MAC (in the M-CMTS core) and PHY (in the UEQAM). In an M-CMTS system, DEPI 220 implements both a data plane for DOCSIS frames, and a control plane for setting up, maintaining, and tearing down sessions.

In operation, after initialization of the cable modem CM 240, in order to transmit a packet upstream from the CM, it first sends a bandwidth request to the M-CMTS Core. The M-CMTS Core, and more specifically an upstream scheduler 226, manages upstream bandwidth allocation by generating and transmitting MAP messages downstream to the CMs. MAP messages inform the CMs about the allocation of upstream spectrum in the time dimension, using time slots or "minislots." The M-CMTS Core must ensure that MAP messages reach the CMs in a timely manner. These are subject to various delays. For some purposes, we analyze the round-trip delay, which is from the time of a CM Request for bandwidth to the time the CM transmits the data corresponding to that request. In the following discussion, we focus on the request grant part of the delay.

There are competing factors regulating the generation and delivery of MAP messages. The MAP message is transmitted from the M-CMTS core to the UEQAM for modulation and delivery (typically over coax) to the CMs. MAP messages must be sent early enough to allow the CMs to process the information contained in MAP messages before the scheduled transmission time. MAPs must also be sent as late as possible so as to minimize the request-grant latency which in turn affects upstream packet latency.

In the integrated (as distinguished from Modular M-CMTS) "I-CMTS" environment, MAP messages are sent from the I-CMTS to CM across an HFC (Hybrid Fiber-Coax) network which maintains essentially constant delay between the I-CMTS and each of the CMs. The propagation time of MAP information between the I-CMTS and the CMs thus remains relatively constant in the integrated CMTS (I-CMTS). The MAC controllers in known I-CMTS are able to monitor MAP streams and count certain late MAPs. MAP packets are counted as late when the Alloc Start Time in the MAP packet is older than the current CMTS time. That method is useful only to detect severely delayed MAP packets as it does not account for the required propagation time from the CMTS to the CM and for CM's processing allowances.

The ability to precisely monitor the transport performance and regulate timing of the MAP generation becomes more important in the distributed M-CMTS environment, illustrated in FIG. 2, where MAP messages typically are transmitted across a CIN with variable delay between the M-CMTS Core 202 and the UEQAM 210. (There may be multiple UEQAMs associated with one core.) The CIN adds variable delay which may be a significant portion of in the total system round-trip delay time. Typically, the CIN is configured and managed by the operator. Its extent may vary widely from one system to another. It may be as simple as a short Ethernet cable between one M-CMTS Core and one UEQAM. Alternatively, it may be an IP or other packet switched network including multiple switch and/or router hops which is shared with other (non-DEPI) traffic to and from other nodes (e.g. VOD servers). IP Traffic and Network design can greatly affect the variable delay of the CIN Network.

In the D-MPT mode of DEPI, the MAP messages are sent within the data stream and need to be de-jittered at the UEQAM. The transfers across the CIN and buffering at various stages of the distributed system increase the overall propagation delay (latency) for MAP packets. The additional latency for propagating MAP messages in the M-CMTS environment (over I-CMTS) can range from 400 usec to a few milliseconds in current systems. Since larger latency may negatively impact the upstream performance, it becomes increasingly important to reduce the overall request-grant round trip time. The inventions disclosed here do not directly help to reduce the downstream propagation delay on the path between the M-CMTS and the CMs. Rather, in various embodiments, aspects of the present invention can be used, for example, to reduce the margins calculated into the MAP advance time, detect congestion in the UEQAM, and other uses further described below.

MAP Advance Time

Error free operation with minimal margins for MAP advance time and variable latency requires an effective tool for verification that MAPs are timely delivered across the network, and useful information to adjust the MAP advance time in the MAP generation process in the M-CMTS core. The UEQAM and the M-CMTS core are precisely synchronized (with sub microsecond precision) through the DTI (DOCSIS Timing Interface), and maintain the same reference of time. The MAP messages include a field "Alloc Start Time" defined as "the effective start time from CMTS initialization (in units of mini-slots) for assignments within this map". The Alloc Start Time is inserted into the MAP frames by the upstream bandwidth scheduler on the M-CMTS core and describes the start time of a future period when the CMTS expects to receive the first burst scheduled in the MAP. The difference between the actual DOCSIS time at the CMTS, at the time when the MAP packet is generated, and the future Alloc Start Time is called MAP Advance Time ("MAT").

MAT thus represents the budget of time for downstream propagation and processing of information carried in MAPs, as well as the upstream burst transmission and propagation time. Importantly, the value often chosen for the MAT is somewhat an educated guess. It is an educated guess in particular in M-CMTS systems because the transport of MAPs from the M-CMTS Core to the UEQAM is an open-loop system. There is no feedback in prior art from the UEQAM to the M-CMTS core on the state of the MAP timing. This invention seeks to create a closed-loop path between the M-CMTS Core and The UEQAM that will feedback critical MAP information to the M-CMTS Core thus allowing the M-CMTS Core to dynamically adjust the MAT.

In accordance with one aspect of the present invention, a modified UEQAM is configured to monitor MAP Advance Time (MAT). This can be done, in one example, at a final stage downstream processing pipeline (not shown) of the UEQAM, where the latency between the test point and the output of the RF port remains constant. The UEQAM 210 and the M-CMTS core 202 are linked through an L2TP connection 220 which allows them to transmit data (DEPI data plane) from the M-CMTS core to the UEQAM as well as to exchange control information (DEPI Control Plane). (The L2TP protocol typically utilizes UDP datagrams to create and maintain a virtual tunnel between IP peers.)

In accordance with another aspect of the invention, the M-CMTS core will transfer a "MAP monitoring request" and or monitoring parameters to the UEQAM and retrieve the results of MAP monitoring. For example, this can be implemented by vendor-specific extensions to the DEPI L2TPv3 Control Plane, as provided by CableLabs industry standards. The upstream bandwidth scheduler 226 in the M-CMTS Core 200 controls the MAP Advance, and may adjust it to accommodate dynamic plant conditions and channel parameter changes such as a DS interleaver depth. The MAP Advance adjustment may be made based on the results of MAP monitoring provided by the UEQAM 210.

One Example Implementation

Figure 3:
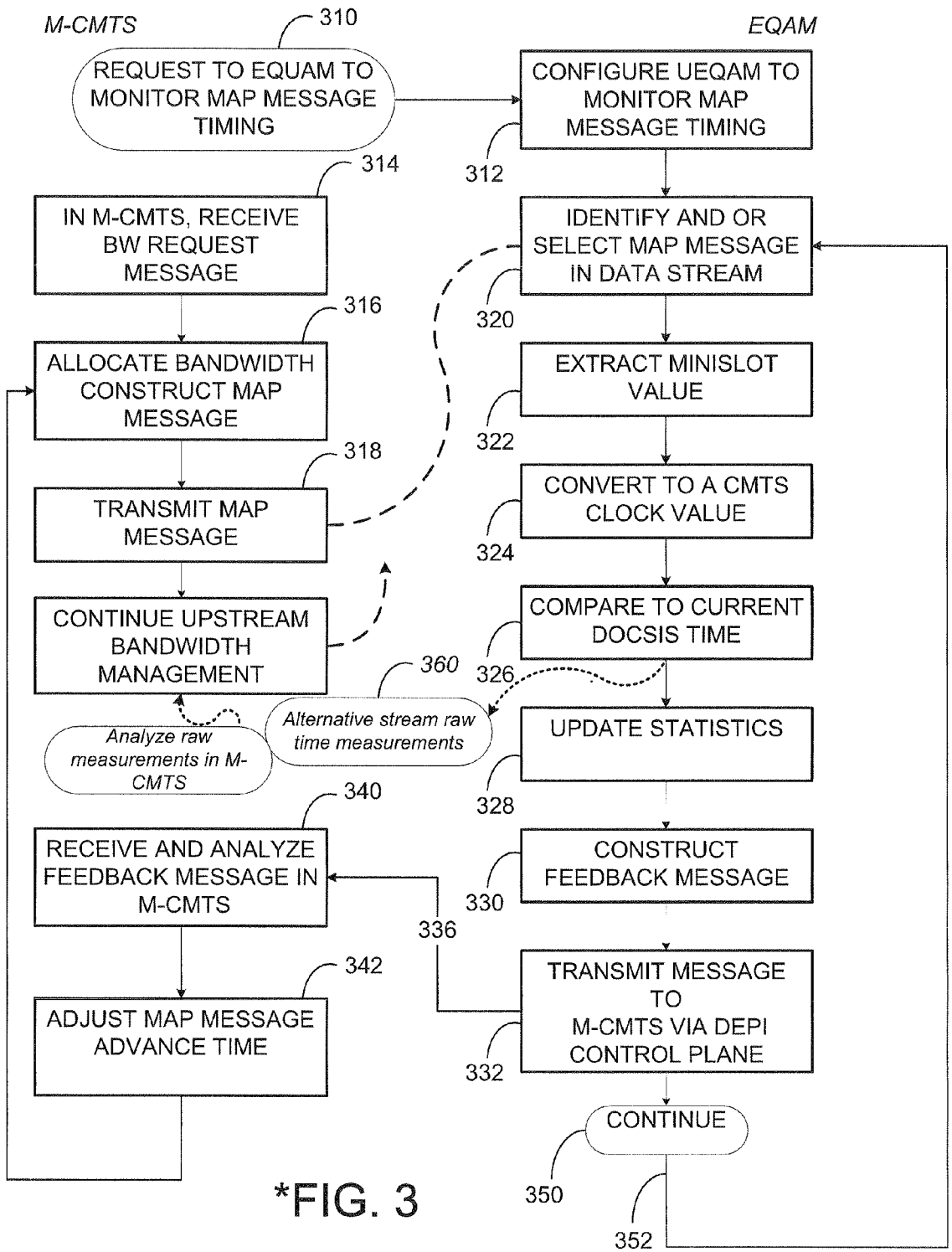
FIG. 3 is an example flow diagram of a MAP message monitoring process in accordance with one embodiment of the invention.

In one embodiment, the UEQAM device and the M-CMTS core jointly implement a system, which precisely monitors the timeliness of delivery of MAP messages and optimizes the MAP advance time as explained above. Referring now to FIG. 3, the left side of the diagram generally illustrates processes in the M-CMTS, while the right side illustrates processes in the UEQAM. An M-CMTS compatible UEQAM device preferably implements circuitry and or code to identify and analyze MAP messages in the data-plane stream sent from M-CMTS core, as follows. A request message 310 to monitor MAP message timing can originate in the M-CMTS or in a system management component (250 in FIG. 2). The request message 310 may include various instructions and or parameters for use by the UEQAM in monitoring, analyzing and reporting on MAP message timing. For example, it may request monitoring of certain MAP messages, or it may set timing threshold values. The UEQAM configures itself 312 in response to the request message 310 and monitors the DEPI data plane accordingly. Next the UEQAM identifies a selected MAP message in the data stream 320, and then extracts the minislot value, 322, from "Start Alloc Time" field of the MAP message. The UEQAM device converts the minislot value to a M-CMTS clock value, 324, and then compares it to the current time value at the UEQAM, step 326. If the difference between the two compared values, which we will call a "MAP delay metric," is smaller than a defined threshold, the MAP message may be categorized as late or potentially late. In one embodiment, MAP messages identified as late may be counted, reported to management system or to the M-CMTS core. In general, the UEQAM updates timing statistics 328 (see below), and then constructs a feedback message 330, as mentioned above, and transmits the feedback message to the M-CMTS, step 332. The monitoring process continues 350 and loops back via 352 to identify and select the next MAP message of interest.

In one embodiment, an event of detection of a late MAP preferably will trigger an alarm or a notification to a management system or the M-CMTS core. The M-CMTS core and the UEQAM maintain a DEPI control-plane connection through which information on MAP timing measurements, and or various related statistics can be exchanged and used to adjust the MAP advance time in the MAP generation process in the M-CMTS core. For example, the UEQAM may determine and maintain a running average of the MAP delay metrics and send that number back. The UEQAM could also supply local information such as local congestion levels when the MAP passes through. Further statistics, by way of illustration and not limitation, may include the following: (a) how many MAPs received within delay metric threshold; (b) how many outside thresholds; (c) identification of specific late MAP. Preferably, these communications may be implemented through extensions to standard DEPI control plane protocols.

Referring again to FIG. 3, the feedback message is received in the M-CMTS Core via the DEPI L2TPv3 Control Plane 336, and it is analyzed, 340, and used in connection with adjusting MAP advance time if necessary, 342. The M-CMTS takes this into account in constructing a subsequent MAP message 316. The MAP message is transmitted as usual 318, and the foregoing processes continue. In one embodiment, for example, the M-CMTS Core may accumulate statistics based on timing feedback from the UEQAM. It may then adjust the MAT based on those statistics, either periodically or when a predefined threshold is crossed, for example a frequency of "late MAPs." In another embodiment, the M-CMTS may be programmed to gradually tighten up the MAT, until late messages are indicated in the UEQAM feedback loop, thereby dynamically optimizing the system performance. This information may be taken into account in conjunction with other factors such as network loading. In another example, the M-CMTS Core may increment the MAT by a predetermined increment (delta) responsive to an indication in the feedback loop that one (or at least a predetermined threshold number) of MAPs have been characterized as late. Implementation typically will involve updating both the M-CMTS core and the UEQAM elements. We use the term UEQAM broadly to include a Universal UEQAM or "EQAM." Updating these designs can be accomplished through modification of any or all of the component hardware designs, circuits, software, firmware, FPGA code, etc. Details of such updates will be matters of engineering design choices made in the light of this disclosure.

As mentioned, the UEQAM monitoring and reporting of MAP message expediency information can be initiated or triggered by a control message from a management system (e.g., Operations Support System 250) or from the M-CMTS Core 212. Either entity may send parameters to tell the UEQAM to examine certain MAP messages, what parameters to monitor, and optionally set threshold values. For example, the requester may instruct the UEQAM to analyze embedded timestamps versus local time on the UEQAM. Recall the M-CMTS architecture typically includes a DTI server that feeds (DOCSIS) time information to both devices (M-CMTS Core and UEQAM).

In another embodiment, the UEQAM can be configured 312 (or controlled) so as to stream raw time measurements back to the M-CMTS for it to calculate statistics locally. This is shown at 360 in FIG. 3. Various load balancing arrangements can be employed in this regard. The allocation can also be varied dynamically by using the control channel for that purpose. For example, when the UEQAM is heavily loaded (congested), the calculation of MAP delay statistics can be shifted back to the M-CMTS Core. This reconfiguring aspect points up another source of delay, namely backup in the UEQAM queue. Information regarding that queue also can be fed back to the M-CMTS Core using the closed-loop feedback techniques described herein. Accordingly, the reader will appreciate that the present disclosure can be readily adapted and applied for implementing features including but not limited to providing MAP delay statistics; tuning MAP advance time, and notifying an operator of network congestion.

Another application of the present invention relates to a Next Gen I-CMTS system which maintains an internal M-CMTS system architecture where there will be a separate upstream line card in the same chassis. In such system the upstream line card will take the role of the M-CMTS core and the downstream line card will take the role of the UEQAM. The B/W REQ will be stripped locally on the US line card, and a DEPI tunnel will exist from the upstream card to the downstream card. In such a system, it is possible to tag in time both the incoming REQ on the upstream card and the outgoing MAP on the downstream card, as well as several interim points (departure from US card; arrival at DS LC). This arrangement provides a precise REQ-GNT delay measurement which would be communicated as a message across the DEPI tunnel. The system would then decrease the MAT accordingly using the previously mentioned algorithms.

In various embodiments, aspects of the present disclosure provide advantages over prior art, including but not limited to the following:
- Enable effective monitoring of the transport time of time-sensitive MAP messages across a part of the transmission path on which latency can vary.
- Provide monitoring information useful by the M-CMTS Core to optimize (i.e., use minimum value) MAP Advance Time, thus improving upstream performance (reducing latency, increasing PPM flow.
- A preferred embodiment does not add any significant overhead in the DEPI control plane protocol.
- A preferred embodiment does not require modifying existing data plane processing at the M-CMTS.
- A preferred embodiment helps to maintain performance relative to I-CMTS systems.
- In addition to cable modem networks, the teaching of this disclosure may be applied to WiMax systems which also employ DOCSIS type of MAP messages.

CONCLUSION

Several examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method, comprising:
receiving a cable modem bandwidth request at a Modular Cable Modem Termination System (M-CMTS) having an M-CMTS core and a Universal Edge QAM (UEQAM);
in the M-CMTS core, generating a bandwidth grant message allocating upstream bandwidth for a time segment, the generated bandwidth grant message allocating a portion of the time segment responsive to the received cable modem bandwidth request;
transferring the bandwidth grant message to the UEQAM;
processing the bandwidth grant message in the UEQAM for transmission to the requesting cable modem;
analyzing the bandwidth grant message in the UEQAM; and
transmitting the analysis from the UEQAM to the M-CMTS core for use in adjusting bandwidth grant message generation.

2. The method of claim 1, further comprising:
receiving the analysis in the M-CMTS core; and
dynamically adjusting a bandwidth allocation map (MAP) advance time (MAT) value of bandwidth allocation map (MAP) messages generated by the M-CMTS core responsive to data included in the received analysis.

3. The method of claim 1, wherein:
transmitting the analysis from the UEQAM to the M-CMTS core includes forming data from the analysis into a control layer message for transmission from the UEQAM to the M-CMTS core to provide closed-loop feedback on MAP timing bandwidth allocation map (MAP) timing.

4. The method of claim 3, wherein the control layer message comprises an L2TP control-plane message.

5. The method of claim 1, wherein said analyzing the bandwidth grant message includes:
in the UEQAM, monitoring bandwidth allocation map (MAP) advance time at a final stage downstream processing pipeline where latency between a test point and an output of a corresponding Radio Frequency (RF) port of the UEQAM remains substantially constant.

6. A Modular Cable Modem Termination System (M-CMTS) core comprising:
an interface for communication with an M-CMTS compatible Universal Edge QAM (UEQAM);
a scheduler for scheduling upstream bandwidth responsive to receiving a request from a cable modem;
the M-CMTS core configured to receive a feedback message from the UEQAM via a DEPI L2TPv3 control-plane communication interface, the feedback message including information regarding timing of at least one bandwidth allocation map (MAP) message generated by an upstream bandwidth scheduler and received at the UEQAM; and the scheduler configured to adjust MAP advance time responsive to the timing information contained in the feedback message received from the UEQAM.

7. The M-CMTS core according to claim 6, wherein the M-CMTS core is configured to receive the feedback message from the UEQAM via a DEPI control plane of said DEPI L2TPv3 interface.

8. The M-CMTS core according to claim 7, wherein the scheduler adjusts MAP advance time responsive to indicia in the feedback message of a counted number of MAP messages categorized by the UEQAM as late or potentially late.

9. The M-CMTS core according to claim 8, wherein the M-CMTS core takes a predetermined action responsive to the feedback message, the action comprising at least one of reporting a late MAP message count to a management system and reporting the late count to the upstream bandwidth scheduler.

10. The M-CMTS core according to claim 8, wherein the M-CMTS core is configured to send a request to the UEQAM to monitor MAP message timing.

11. The M-CMTS core according to claim 7, wherein the M-CMTS core and the UEQAM maintain a DEPI control-plane connection, and communicate the feedback message to the M-CMTS core over the DEPI control-plane connection.

12. The M-CMTS core according to claim 7, wherein:
the M-CMTS core includes a MAP generation process for generating MAP messages;
a time delay determined by the UEQAM is reported to the MAP generation process in the M-CMTS core; and
the MAP generation process adjusts a MAP timing advance value in the MAP messages responsive to the time delay reported by the UEQAM, the time delay of a selected MAP message determined in the UEQAM by:
extracting a minislot value from a Start Alloc Time field of the selected MAP message;
converting the extracted minislot value to a CMTS clock value;
comparing the CMTS clock value to a current time value at the UEQAM; and
determining a time difference between the CMTS clock value and the current time value at the UEQAM as the time delay.

13. The M-CMTS core according to claim 7, wherein the feedback message from the UEQAM includes MAP packet delay statistics.

14. The M-CMTS core according to claim 7, wherein the feedback message from the UEQAM includes indicia of a local congestion level.

15. The M-CMTS core according to claim 7, wherein the feedback message from the UEQAM includes a running average of MAP delay defined as a time difference between a CMTS clock value of a selected MAP message and a current time value at the UEQAM when the MAP message is processed.

16. A Universal Edge QAM (UEQAM) device for use in a Modular Cable Modem Termination System (M-CMTS), the UEQAM comprising:
a processing device configured to:
receive a stream of bandwidth allocation map (MAP) messages for transmission downstream;
measure a time delay of at least one of the MAP messages; and
transmit, via a DEPI L2TPv3 control-plane communication interface, a feedback message to an M-CMTS core from which the MAP messages originated, the feedback message including information based on the measured time delay of at least one of the MAP messages.

17. The UEQAM device according to claim 16, wherein the processing device is configured to measure the time delay of a selected MAP message by:
extracting a minislot value from a Start Alloc Time field of the selected MAP message;
converting the extracted minislot value to a CMTS clock value;
comparing the CMTS clock value to a current time value at the UEQAM; and
determining a time difference between the CMTS clock value and the current time value at the UEQAM as the time delay of the selected map message.

18. The UEQAM device according to claim 16, wherein the processing device is configured to transmit the feedback message to the M-CMTS core via a DEPI control-plane connection.

19. The UEQAM device according to claim 16, wherein the processing device is configured to:
receive a command to begin MAP delay monitoring; and
measure the time delay of at least one of the MAP messages in response to the command.

20. The UEQAM device according to claim 19, wherein the processing device is configured to receive the command via a DEPI control-plane to begin MAP delay monitoring.

21. A method, comprising:
receiving a cable modem bandwidth request at a Universal Edge QAM (UEQAM) of a Modular Cable Modem Termination System (M-CMTS);
forwarding the cable modem bandwidth request to an M-CMTS core of the M-CMTS;
after forwarding the cable modem bandwidth request, receiving at the UEQAM a bandwidth grant message generated by the M-CMTS core, the generated bandwidth grant message allocating a portion of a time segment to a requesting cable modem corresponding to the cable modem bandwidth request;
processing the received bandwidth grant message in the UEQAM for transmission to the requesting cable modem;
analyzing the bandwidth grant message in the UEQAM; and
transmitting the analysis from the UEQAM to the M-CMTS core for use in adjusting bandwidth grant message generation.

22. The method of claim 21, further comprising:
receiving the analysis in the M-CMTS core; and
dynamically adjusting a bandwidth allocation map (MAP) advance time (MAT) value of bandwidth allocation map (MAP) messages generated by the M-CMTS core responsive to data included in the received analysis.

23. The method of claim 21, wherein:
transmitting the analysis from the UEQAM to the M-CMTS Core includes forming data from the analysis into a control layer message for transmission from the UEQAM to the M-CMTS Core to provide closed-loop feedback on MAP timing bandwidth allocation map (MAP) timing.

24. The method of claim 23, wherein the control layer message comprises an L2TP control-plane message.

25. The method of claim 21, wherein said analyzing the bandwidth grant message includes:
in the UEQAM, monitoring bandwidth allocation map (MAP) advance time at a final stage downstream processing pipeline where latency between a test point and an output of a corresponding Radio Frequency (RF) port of the UEQAM remains substantially constant.

* * * * *